(12) United States Patent
Mario et al.

(10) Patent No.: US 10,414,682 B2
(45) Date of Patent: Sep. 17, 2019

(54) PROCESS AND DEVICE FOR MELTING AND FINING GLASS

(71) Applicant: SAINT-GOBAIN GLASS FRANCE, Courbevoie (FR)

(72) Inventors: Olivier Mario, Paris (FR); Arnaud Le Verge, Paris (FR); Jean-Marie Combes, Eaubonne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 404 days.

(21) Appl. No.: 15/307,258

(22) PCT Filed: Apr. 23, 2015

(86) PCT No.: PCT/FR2015/051107
§ 371 (c)(1),
(2) Date: Oct. 27, 2016

(87) PCT Pub. No.: WO2015/166172
PCT Pub. Date: Nov. 5, 2015

(65) Prior Publication Data
US 2017/0050874 A1 Feb. 23, 2017

(30) Foreign Application Priority Data

Apr. 29, 2014 (FR) ..................... 14 53902
Apr. 29, 2014 (FR) ..................... 14 53903

(51) Int. Cl.
*C03B 5/04* (2006.01)
*C03B 18/02* (2006.01)
(Continued)

(52) U.S. Cl.
CPC ............... *C03B 5/04* (2013.01); *C03B 5/182* (2013.01); *C03B 5/23* (2013.01); *C03B 18/02* (2013.01); *Y02P 40/57* (2015.11)

(58) Field of Classification Search
CPC .. C03B 5/04; C03B 5/182; C03B 5/23; C03B 7/06; C03B 18/02; Y02P 40/57
See application file for complete search history.

(56) References Cited

U.S. PATENT DOCUMENTS

| 3,261,677 A | 7/1966 | Plumat |
| 4,046,546 A | 9/1977 | Hynd |
(Continued)

FOREIGN PATENT DOCUMENTS

| CN | 201250173 Y | 6/2009 |
| CN | 102320721 A | 1/2012 |
(Continued)

OTHER PUBLICATIONS

International Search Report dated Jul. 21, 2015, in PCT/FR15/51107 filed Apr. 23, 2015.
(Continued)

*Primary Examiner* — Joseph S Del Sole
*Assistant Examiner* — Mohamed K Ahmed Ali
(74) *Attorney, Agent, or Firm* — Oblon, McClelland, Maier & Neustadt, L.L.P.

(57) ABSTRACT

The invention relates to a process and a device for manufacturing molten glass comprising from upstream to downstream a furnace for melting and fining glass equipped with cross-fired overhead burners, then a conditioning basin supplied with glass by the furnace, the dimensions of this manufacturing device being such that K is higher than 3.5, the factor K being determined from the dimensions of the device. The invention makes it possible to dimension a device for melting glass so that it is smaller and consumes less energy while producing high quality glass.

39 Claims, 2 Drawing Sheets

Figure 1:
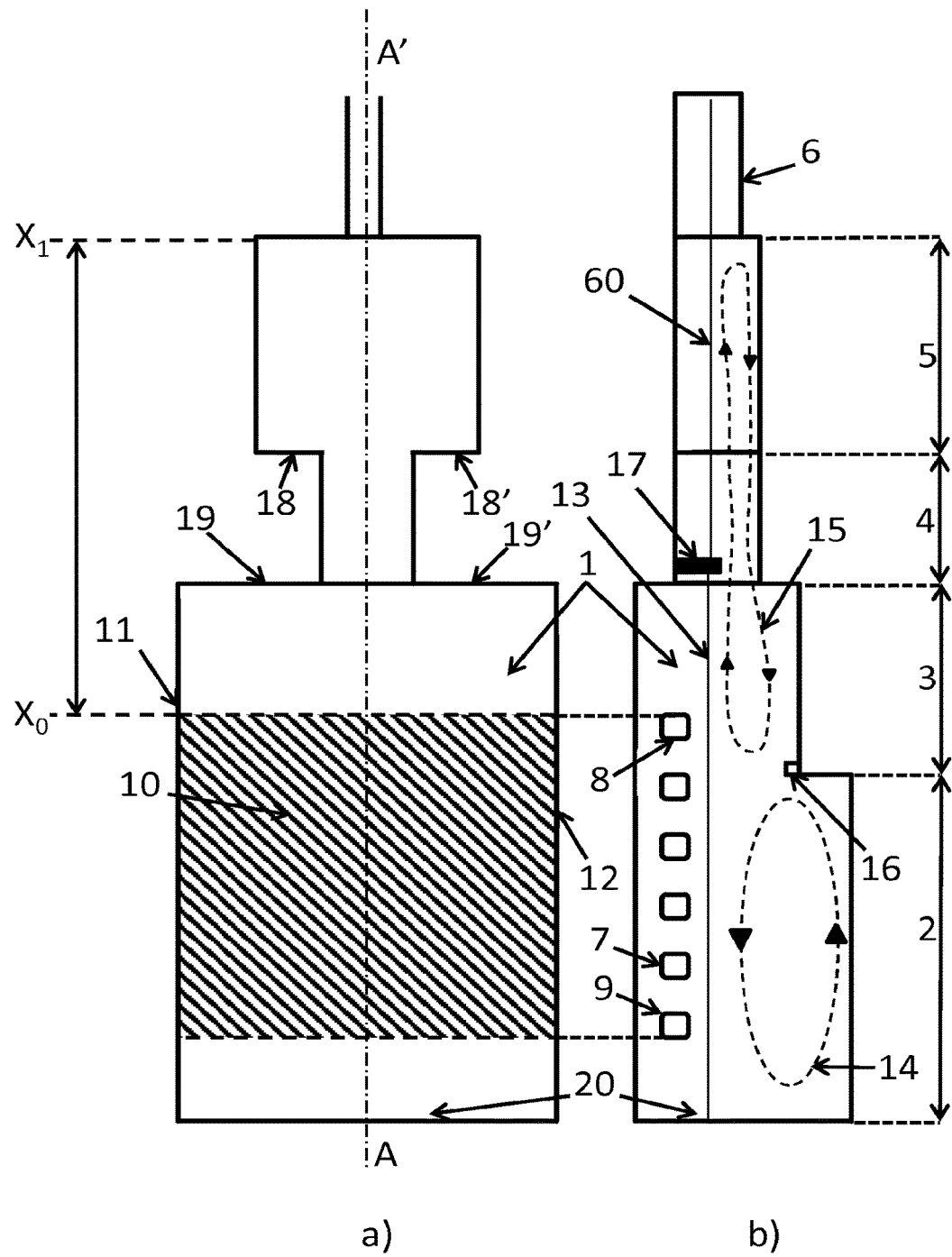

(51) Int. Cl.
 *C03B 5/23* (2006.01)
 *C03B 5/182* (2006.01)

(56) References Cited

U.S. PATENT DOCUMENTS

| | | | | |
|---|---|---|---|---|
| 4,929,266 A | * | 5/1990 | Cozac | C03B 5/03 65/134.5 |
| 5,078,777 A | * | 1/1992 | Cozac | C03B 5/03 65/339 |
| 5,433,765 A | | 7/1995 | Muniz et al. | |
| 5,609,661 A | | 3/1997 | Moreau et al. | |
| 5,655,464 A | | 8/1997 | Moreau et al. | |
| 5,766,296 A | * | 6/1998 | Moreau | C03B 5/182 65/134.5 |
| 2012/0216578 A1 | | 8/2012 | Pahmer et al. | |
| 2014/0366583 A1 | | 12/2014 | Kuhn et al. | |

FOREIGN PATENT DOCUMENTS

| | | |
|---|---|---|
| EP | 2 168 923 B1 | 9/2013 |
| FR | 2 299 277 A1 | 8/1976 |
| FR | 2 951 156 A3 | 4/2011 |
| WO | WO 2012/137161 A1 | 10/2012 |

OTHER PUBLICATIONS

French Preliminary Search Report dated Jan. 6, 2015, in French Application No. 1453902 filed Apr. 29, 2014 (with English Translation of Categories of Cited Documents).

Shiqing Xu, et al. "3D fluid flow regularity in a float glass furnace. Part 2. Circulation disorder phenomenon due to changing the iron content", Glass Technology: European Journal of Glass Science and Technology Part A, vol. 57, No. 2, XP001596834, 2016, pp. 70-77.

* cited by examiner

PROCESS AND DEVICE FOR MELTING AND FINING GLASS

The invention relates to a process and device for melting, fining and conditioning molten glass consuming little energy and capable of delivering a high-quality glass that can in particular be supplied to a glass float chamber in order to manufacture flat glass.

A device for melting and forming glass is composed in succession of a charging zone, a melting and fining zone, a conditioning zone and lastly a forming zone. The charging zone serves to introduce raw materials into the furnace. The melting zone is the place where the raw materials are transformed into a glass melt. In order to obtain a glass melt of optimal quality in terms of liquidity, uniformity and bubble removal, it is necessary to achieve very high temperatures in the melting zone, by virtue of fossil fuels or electrical power. The conditioning zone then serves to cool the glass so as to bring it to the forming temperature, much lower than the temperatures experienced by the glass during its production.

A device for manufacturing glass must lead to a high-quality glass, i.e. a glass containing as little as possible unmelted material and as few as possible bubbles, with a high productivity but with an energy consumption and construction cost that are as low as possible. The construction cost of such installations makes innovation in this field difficult and slow. This is why the present inventors have carried out an in-depth study of convection mechanisms in the molten glass taking place in the successive basins receiving the glass in order to find the most suitable dimensions and operating mode.

EP 650 934 teaches a device for melting glass comprising a flat-bottomed fining and melting basin supplying a flow channel that is sufficiently shallow to prevent a molten glass recirculation cell from forming. The melting and fining basin is the seat of two convective circulation loops. No conditioning basin is provided downstream of the fining zone. No backflow of the glass exists downstream of the fining zone. Defects are necessarily created downstream of the fining zone.

EP 2 168 923 teaches a device for preparing molten glass comprising a melting and fining furnace the bottom of which gradually rises between a small melting zone and a large fining zone via a plurality of steps. The flow of glass output from this furnace is a plug flow.

FR 2 299 277 teaches a device for melting and fining glass comprising a conditioning basin in which the flow is a plug flow. Although a partial backflow occurs toward the fining zone in the fining basin, this zone of backflow is much too short to obtain enough of an effect as the probability of defects appearing in the rest of the device shows. In addition, this zone is so short that it must necessarily contain powerful cooling means before the glass penetrates into the zone of plug flow, which may also be considered to form the start of a channel.

U.S. Pat. No. 3,261,677 teaches a furnace comprising a fining zone that is so shallow that no backflow can take place therein. The absence of backflow toward the melting zone is unconducive to the digestion of defects. At this very shallow location, the bottom is necessarily at a very high temperature (of about 1470° C.) promoting wear of the refractories of the bottom and conducive to the generation of defects in the glass.

CN 2012/50173Y teaches a step of 250-350 mm in a furnace of 1100-1300 mm depth. The other dimensions of the furnace are determinable from the drawings. On the whole, such a furnace has a high power consumption and leads to a low-quality glass. This is corroborated by the fact that this furnace is calculated to have a K factor as defined in the present application of about 1.

CN 102 320 721 teaches a furnace that supplies a bevelled (as seen from above) channel directly (i.e. there is no working end). There is no backflow in the channel. The glass is necessarily much too hot at the inlet of this channel. Very intense blowing would be required to sufficiently cool the glass in this channel and this would result in the optical quality of the glass being degraded. Specifically, the blowing intensity $\Delta$Souff would be about 193% if expressed as in the examples of the present application.

Convection due to temperature gradients in the furnace leads the glass to flow in the furnace. Thus, a convection loop or cell commences with liquefaction, of the charged batch, before then descending toward the bottom of the furnace where it stays until the bottom hot point where the glass rises towards the surface. A second circulation loop, downstream of the first, called the downstream loop, may form from the hot point of the bottom of the melting/fining furnace, rising and circulating at the surface up to the furnace outlet and exiting the furnace in order to pass into the conditioning basin. The glass in the furnace is hotter than in the conditioning basin. It is recommended for the bottom temperature in the melting and fining furnace to be less than 1400° C. It is because the glass in the melting and fining furnace is deep enough to allow recirculation loops to form that the bottom temperature may be kept below 1400° C.

The terms upstream and downstream in the present application of course refer to the flow direction of the glass, which flows from upstream to downstream.

The terms "cell" and "loop" are synonymous in the present context. The position of the recirculation loops of the glass has often been described in prior-art patents but very little attention has been given to their intensity and to their mutual interactions. It has now been discovered that a recirculation loop may have a flux representing several times the pull of the melting device and that modifying a recirculation loop in terms of its position or its intensity has repercussions on the characteristics of a neighbouring recirculation loop. Thus, it has been observed that the geometric parameters of the device for manufacturing molten glass and the way in which said device is operated directly impact on the position and respective equilibrium of the two cells, and on their convective intensity. The greater the intensity of a recirculation loop, the more this loop itself requires energy from the furnace. To these recirculation effects in the molten glass are added those related to the evolution of bubbles in the glass, which it is desirable to remove by making them migrate towards the surface of the glass, but which may also be absorbed by the glass in colder zones. In addition, the concentration of fining agent (most often sodium sulphate) decreases as the glass flows since it is gradually consumed, and at a rate that increases as the temperature of the glass increases. Before arriving at the forming device, in particular of flat glass, the glass must be cooled to a temperature appropriate for its forming. This is the role played by a conditioning basin. The conditioning basin may comprise only a single compartment, but in general it comprises at least two compartments. The conditioning basin may therefore comprise a plurality of compartments arranged in series one behind the other and passed through in succession by the glass. More generally, the conditioning basin consists of two successive compartments, the first of which is called the neck or waist and the second of which is called the working end. Generally, the melting/fining furnace opens directly onto the neck. Generally, the neck opens directly onto the working end. A neck contains no burners and generally no heating means. The working end is equipped with a device for blowing air across the surface of the glass in order to bring the glass to the correct temperature. The air blown into the working end generally passes into the neck that precedes it, thereby also contributing to the cooling of the glass. The cross section of flow and the width of flow of the glass in the conditioning basin, which generally starts with a neck, are much smaller than in the furnace and are much larger in a working end than in a neck. The cross section of flow of the glass is related to the geometry of the device. This is especially true as regards the glass height since such a device has a dedicated tank, constructed from refractory blocks called "tank blocks", for making contact with the glass and containing it. The glass height in the device generally corresponds to the distance between the upper level of the tank blocks decreased by a safety margin generally comprised between 30 and 130 mm, and the level of the bottom. Those skilled in the art call the set of blocks making contact with the glass the "substructure". The term "superstructure" is used to refer to the materials arranged above the infrastructure. The superstructure material, since it is located above the tank blocks of the substructure and does not make contact with the glass but rather with the atmosphere of the furnace, generally has a different nature to that of the tank blocks of the infrastructure. Even if the material used for the superstructure is identical to that of the substructure, those skilled in the art will immediately differentiate between these two portions of the construction. The presence of tank blocks is characteristic of a material made to receive the molten glass and concerns the entire length of the device, i.e. both the furnace and the conditioning basin. Thus, in the device and process according to the invention, the glass height (used in the calculation of the cross section of flow of the glass) is generally equal to the height of the tank blocks decreased by 30 to 130 mm, in particular 80 mm (middle of the range of 30 to 130 mm). Thus, the present application also relates to a device the tank blocks of which are such that the level of the surface of the glass is a distance comprised between 30 and 130 mm under the upper level of the tank blocks, such that the K value according to the invention is higher than 3.5 and preferably higher than 5.5 and even more preferably higher than 7.5. In particular, the K value may be higher than 9, or even higher than 10.5, or even higher than 13.

After the conditioning basin, the glass passes into a channel that itself supplies a forming device. The height (or depth) of the glass in the channel is much lower than its height (or depth) in the conditioning basin just before the channel, so that no glass recirculation takes place in the channel. Therefore, the glass flow in the channel is a plug flow. This does not prevent the glass from following curved or coil-like trajectories in this channel; however whatever the trajectory it always starts upstream and ends downstream. This channel is advantageously as short as possible. This is because the defects that are liable to appear in the channel because of contact between the glass and the walls and bottom of the channel will inevitably be incorporated into the glass passing into the forming device since there is no backflow in the channel. The probability of defects appearing in the channel is therefore decreased if the length of the channel is decreased. The length of the channel is generally comprised in the range extending from 0.3 to 10 m and more generally in the range extending from 0.8 to 6 m. The downstream end of the channel corresponds to the abscissa, on the longitudinal axis of the device, at which the glass breaks contact with the refractory bottom of the channel. In the case of a float chamber for making flat glass, this corresponds to the end of the lip over which the glass is poured onto the molten metal. In the case of a rolling device in which the glass is passed between rollers, this corresponds to the point where the glass makes contact with a roller. The channel may especially correspond to the portion 14 of FIGS. 1 and 2 of EP 650 933, or to the channel in FIGS. 1 and 2 in EP 616 983 A1, with or without its stirrers 15 to 18, though the median portions 13, 14 of this channel will be shortened or even absent. In addition, the bottom of the channel may be inclined slightly upward in the downstream direction with a slope comprised between 0 and 6° to the horizontal, the increase in height generally not exceeding 100 mm.

Regarding the passage of the glass from the melting/fining furnace to the conditioning basin, the latter possibly starting with a neck, the width of the flow of the glass is abruptly decreased by at least 30% and generally by at least 50% by the downstream walls of the furnace making an angle with the flow direction of the glass of at least 40° and even at least 60° and generally of 90°. This decrease is obtained with two walls located on either side of the median longitudinal axis of the device. The conditioning basin is longer than 2 m in length, and generally longer than 5 m in length, in the general flow direction of the glass, i.e. from upstream to downstream along the median longitudinal axis of the device.

Coming from the furnace, the entrance of the conditioning basin is generally protected by a thermal screen that extends from the roof as far as the glass. Generally, this screen is not submerged in the glass. It serves primarily to separate the hot atmosphere of the melting/fining furnace from the cold atmosphere downstream of the furnace and marks the start of the conditioning basin. However, it is possible for the thermal screen to be submerged in the glass.

The conditioning basin may comprise a working end equipped with a device for blowing the glass. Generally the working end is preceded by a neck. The working end and the neck that precedes it differ from each other in that the width of flow of the glass as seen from above is much larger in the working end than in the neck. This width increase is generally obtained with walls making an angle of more than 40° and generally more than 60° and generally an angle of 90° to the lateral walls of the neck. This width increase is obtained with two walls located on either side of the median longitudinal axis of the device. The width is generally increased by at least 30% and more generally by at least 50%. In the case where the glass is formed into flat glass on a molten metal, generally tin, in a float chamber, it is recommended that the glass be at a temperature comprised between 1000° C. and 1400° C. at the outlet of the conditioning basin, i.e. generally at the outlet of the working end. This temperature may depend on the composition of the glass. The intensity of the cooling air blown into a working end must not be too great because it could create optical defects on the surface of the glass. This is why, conventionally, in the art a large working end has been provided in order to avoid having to blow too much air over a small area of glass and running the risk of creating optical defects therein. A neck is longer than 2 m in length and generally longer than 4 m in length, in the general flow direction of the glass, i.e. along the median longitudinal axis of the device. A working end is longer than 2 m in length, and generally longer than 5 m in length, in the general flow direction of the glass, i.e. along the median longitudinal axis of the device.

In the context of the present application, the expression "glass surface" or "surface of the glass" is used to refer to the upper surface of the glass making contact with the atmosphere of the furnace or of the conditioning device, depending on the circumstances. All the convection effects observed in the molten glass in a device for manufacturing molten glass are related to the variation in the temperature in said device from upstream to downstream, i.e. in the melting zone, the fining zone and the conditioning basin, and to the geometry of its various elements. The melting zone is the most upstream zone of the furnace and it comprises at least the first upstream burner of the furnace. The fining zone is the most downstream zone of the furnace, upstream of the conditioning basin. Such a device is a particularly complex system and is difficult to model. Specifically, it is sought to combine the following advantages:

a) high-quality glass; a high-quality glass is obtained by ensuring that the glass spends as long as possible at a higher temperature; there is thus a greater chance of melting particles that are difficult to melt, and in addition a higher temperature promotes bubble removal;

b) low-energy consumption; energy is consumed heating the device but also cooling the molten glass in the conditioning basin, and in particular in the working end, in order to bring the glass to a temperature appropriate for forming.

These objectives are difficult to reconcile since criterion a) demands high temperatures and high convective intensities in order to make a large portion of the glass pass from downstream to upstream in the backflow, the glass downstream already being relatively cool, whereas criterion b) is consistent with providing as little heat as possible and having the least possible need for cooling. Apart from this compromise of properties to be found, it is also sought to minimise construction cost, which implies that the area of the wall, bottom and roof of the various elements of the device for preparing glass, and in particular of the conditioning basin and more particularly of the working end, must be as small as possible. Specifically, in the prior art, the working end is sometimes a similar size to the furnace.

The invention primarily relates to a device for preparing molten glass comprising, from upstream to downstream, a melting and fining furnace then a conditioning basin, and also to a process for producing molten glass with the said device. The furnace is equipped with cross-fired overhead burners, each burner comprising a oxidant inlet and a fuel inlet. The furnace is generally equipped with at least 2 cross-fired burners in each lateral wall and generally has 3 to 10 cross-fired burners in each lateral wall. The power of each cross-fired burner of the furnace generally ranges from 2 to 12 megawatts. The lateral walls, which are generally parallel to each other, are generally separated from each other by a distance of 7 to 16 meters.

The oxidant may be rich in oxygen, even be pure oxygen (oxidant containing 80 to 100 vol % $O_2$) or be based on air (oxidant containing 10 to 30 vol % $O_2$) or even be air or oxygen-rich air or oxygen-depleted air and especially air diluted with combustion flue gases. The cross-fired burners are inserted into the lateral walls (also called the sidewalls) of the melting/fining furnace. In the case where the oxidant is based on air (oxidant comprising 10 to 30 vol % $O_2$), pairs of burners in the lateral walls of the furnace are placed facing and operate in reversal mode as is known in the art.

In the case where the oxidant supplying the cross-fired burners is pure oxygen, the burners are either placed face-to-face or are staggered. In this case, a regenerator is generally not provided to heat the oxygen before it is injected into the furnace.

The raw batch materials are introduced upstream into the melting furnace in order to pass under the flames of the cross-fired burners.

In order to determine suitable dimensions for the device according to the invention, which is used in the process according to the invention, substantial work has been carried out modelling convection and heat-flow effects.

Thus, the invention primarily relates to a device for manufacturing molten glass comprising from upstream to downstream a furnace for melting and fining glass equipped with cross-fired overhead burners, and a conditioning basin supplied directly by said furnace. The conditioning basin leads the glass to a channel supplying a forming device. The dimensions of the manufacturing device are such that K is higher than 3.5, where $$K = K_a + \sum_i K_{S_i}. \quad (1)$$

in which $$K = 0.000727 \times S_f \times \int_{x_0}^{x_1} \frac{[P(x)]^2}{[\sigma(x)]^3} dx \quad (2)$$

in which $S_f$ represents the area under flame in the melting/fining furnace;

$x_0$ is the abscissa in the general flow direction of the glass of the end of the area under flame in the furnace;

$x_1$ is the abscissa in the general flow direction of the glass of the end of the conditioning basin;

$\sigma(x)$ represents the area of the cross section of flow of the glass of the device at the abscissa x;

$P(x)$ represents the perimeter of the cross section of flow of the glass of the device at the abscissa x; and $\Sigma_i K_{Si}$ represents the sum of the $K_{Si}$ due to a singular element in the device downstream of the area under flame in the furnace, a singular element producing, from upstream to downstream and over less than 2 m in the flow direction of the glass, a decrease in the cross section of flow of the glass of more than 10% then an increase in the cross section of flow of the glass of more than 10%, where $$K_{S_i} = 0.0012 \times \left( \exp\left[5.16\left(\frac{\sigma_i - \sigma_{S_i}}{\sigma_i}\right)^{2.55}\right] - 1 \right)\left(\frac{S_f}{\sigma_i}\right)^2 \quad (3)$$

$\sigma_i$ representing the area of the cross section of flow of the glass just upstream of the singular element $S_i$, and $\sigma_{Si}$ representing the area of the minimum cross section of flow produced by the singular element $S_i$.

In all the formulae, the units used are SI units. The cross sections of flow of the glass are measured in planes orthogonal to the general flow direction of the glass.

Preferably, K is higher than 5.5 and even more preferably higher than 7.5 and even more preferably higher than 9, or even higher than 10.5, or even higher than 13. Generally, K is lower than 30.

A high K value reflects a more intense upstream recirculation loop in the melting/fining furnace and a less intense downstream loop in the conditioning basin.

A singular element protrudes into the glass flux, like for example a step placed on the bottom or a barrier submerged in the glass. This singular element produces a minimum cross section of glass flow.

Abscissa values increase in the direction from upstream to downstream.

Singular elements are also taken into account in formula (2) since they cause the height or width of flow of the glass to vary and therefore the cross section of flow of the glass and the perimeter of the cross section of flow to vary. Generally, all the cross sections of glass flow in the device according to the invention have a rectangular or square shape, including level with a singular element. Specifically, a singular element protrudes into the glass from the bottom or from one or both lateral walls, or from above, either on all of or on one or more sides of the square or rectangle forming the cross section of flow of the glass and from which the singular element protrudes. However, the Cross section of flow may be a more complex shape.

The area under flame $S_f$ in the melting/fining furnace is a notion well known in the art. It is equal to the continuous glass area under the smallest quadrilateral covering the exterior limits of the oxidant inlets of the end cross-fired (or not cross-fired) overhead burners in the melting/fining furnace, the upstream side of this quadrilateral being parallel to the upstream wall of the furnace and forming a segment extending from one lateral wall to the other lateral wall, the downstream side of this quadrilateral also being parallel to the upstream wall of the furnace and forming a segment extending from one lateral wall to the other lateral wall. The abscissa $x_0$ of formula (2) corresponds to the downstream side of the quadrilateral of the area under flame. This quadrilateral generally has two of its sides superposed on the lateral walls of the furnace. Generally, the lateral walls of the furnace are parallel and orthogonal to the upstream wall, and this quadrilateral is in this case a square or a rectangle. The furnace may comprise only cross-fired overhead burners. However, in addition to cross-fired overhead burners, the furnace may comprise at least one oxygen burner, in particular at least one crown or cross-fired burner. This is also an overhead burner since its flame is created in the atmosphere of the furnace. Such an oxygen burner may increase the area under flame to be taken into account in formulae (2) and (3) if it is located outside of the area under flame of the oxidant inlets of the cross-fired overhead burners. $S_f$ is the area of glass under the smallest quadrilateral as defined above covering the exterior limits of the oxidant inlets of all the overhead burners, including those of these oxygen burners.

The presence of a singular element, such as a step or barrier, first causes the cross section of flow to decrease and then increase in the flow direction of the glass, this decrease and increase occurring over a distance of less than 2 meters in the general flow direction of the glass (i.e. along the median longitudinal axis of the device). A singular element may for example consist of a step fixed to the bottom of the furnace. It may also be a question of a water-cooled metal barrier supported by the superstructure and introduced from the side, said barrier being introduced into the glass in order to decrease the cross section of flow of the glass. When the glass encounters the step or barrier, the cross section of the glass substantially decreases. Once the glass has passed the step or barrier, the cross section of the glass increases. Because of the singular element, the cross section of glass flow therefore first decreases and subsequently increases, from upstream to downstream. The singular element may also take the form of partitions or a gate arranged on the lateral walls of the device.

One $K_{si}$ corresponds to one singular element. The easiest way to determine whether a singular element is present is to measure the upstream and downstream variations in cross section produced successively by said singular element. The upstream variation in cross section is gauged by measuring the difference in cross section between the section just upstream of the singular element (called the upstream section of the singular element) and the minimum cross section $\sigma_{Si}$ due to the singular element, relative to the cross section just upstream of the singular element. The downstream variation in cross section is gauged by measuring the difference in cross section between the section just downstream of the singular element (called the downstream section of the singular element) and the minimum cross section $\sigma_{Si}$ due to the singular element, relative to the minimum cross section due to the singular element. If these two variations are both larger than 10%, a singular element is present, the $K_{Si}$ of which should be calculated and input into the calculation of the K of the device.

A singular element starts, in the flow direction of the glass, at the point where a wall of said element starts to decrease the cross section of flow of the glass by making an angle to the general flow direction of the glass of greater than 40° (angle inside the singular element). Generally, this angle is 90°. A singular element ends, in the flow direction of the glass, at the point where a wall making an angle (angle inside the singular element) of greater than 40° to the general flow direction of the glass finishes increasing the cross section of flow of the glass. Generally, this angle is 90°. The distance between the start of the singular element and the end of the singular element must be smaller than 2 meters along the median longitudinal axis of the device for a singular element to be considered to be present.

The influence of the dimensions of the device is gauged in terms of quality Q and consumption and depending on whether it is possible to use a small conditioning basin and in particular a small working end. The factor K such as described above takes into account essential parameters making it possible to dimension a device according to the invention so that it has a low energy consumption while still producing glass of excellent quality. The factor K helps to determine devices in which it is possible to use a small conditioning basin. According to the invention, K is higher than 3.5, preferably higher than 5.5 and even more preferably higher than 7.5.

The flows of glass in a device for manufacturing molten glass have been modelled numerically using a commercially available hydrodynamic software package. Depending on the geometry of the device, the software package calculates the energy flux that must be provided to the free surface of the glass to ensure that the maximum surface temperature of the glass is equal to 1590° C. in the melting/fining furnace, and that the temperature of the glass at the outlet of the working end is equal to 1130° C. The glass considered was a standard soda-lime glass with an $Fe_2O_3$ content by weight of 700 ppm and an FeO content by weight of 180 ppm. Thermal losses from the tank and the bottom were standard (4 kW/m²). Trials carried out on actual melting devices have confirmed the relevance of the factor K according to the invention.

Quality Q was determined in the following way. Those skilled in the art know that the quality of a glass melt is improved by leaving it at high temperatures, and more precisely at temperatures higher than the temperature at which chemical fining of the glass takes place, for longer. Based on the flows calculated using the numerical model, 100 000 particles were followed from the upstream wall of the furnace. The quality criteria Q considered is the average time spent above 1400° C., relative to a reference case.

Consumption was determined in the following way: it is a question of the amount of energy that must enter into the glass through its free surface in the melting/fining furnace to ensure that the maximum surface temperature of the glass is equal to 1590° C. in the melting/fining furnace and that the temperature of the glass at the outlet of the conditioning basin is equal to 1130° C., added to the energy required to heat the raw materials until they melt, this amount being quantified in relative terms relative to a reference case (example No. 1 in Table 1). The influence of the size of the conditioning basin on quality Q and consumption, but also on the blowing energy needed to cool the glass, was used to determine whether or not it would be possible to use a small conditioning basin and in particular a small working end. It would be very advantageous to be able to employ a small working end because a small working end requires less material to build and is therefore less expensive. In addition, the area of contact between the materials used to build the conditioning basin and the glass is smaller in the case of a small conditioning basin, thereby decreasing the risk of defects being created in the glass.

According to the invention, it has been discovered that the size of the conditioning basin, and in particular of a working end, can be massively decreased in particular by decreasing the relative intensity of the downstream convection cell, which amounts to having less glass to condition, and which may be achieved via an appropriate K value.

According to the invention, the bottom of the fining compartment and the bottom of the conditioning basin are sufficiently shallow that a single recirculation loop (called the downstream loop) passes through both these elements. This loop passes through all the compartments of the conditioning basin, in particular generally through a neck followed by a working end. Preferably, this downstream loop extends as far as the end of the conditioning basin, generally a working end, i.e. as far as the channel, without entering the channel. The existence of this recirculation loop is essential while remaining of moderate intensity. Specifically, it has been observed that the backflow of this loop contains most of the defects originating from the fining zone, in addition to those generated in the conditioning basin, and that returning them to the fining zone of the furnace generally causes them to disappear. It is accepted by those skilled in the art that a large conditioning basin, and in particular a large working end, is necessary in order to give the glass the time to rest sufficiently that bubbles have the time to escape, and in order to allow the glass to cool to the temperature required to form it. In contrast, it has been discovered that it is better to have a small conditioning basin, and in particular a small working end that is possibly subjected to slightly stronger cooling, because the area of material making contact with the glass is thus minimised and is thus the origin of fewer defects. The small size of the conditioning basin is made possible by virtue of the low intensity of the recirculation loop that passes through it. Specifically, this low intensity means that the recirculation cell transfers less heat from the furnace to the conditioning basin, which can therefore be cooled more moderately. Preferably, the recirculation loop passing through the conditioning basin extends as far as the channel but does not pass into the channel. According to this possibility, the downstream recirculation loop will extend as far as the abscissa $x_1$, which may correspond to the downstream end of a working end. This means that in any vertical plane transverse to the longitudinal axis of the furnace in the conditioning basin there are points in the glass having a negative longitudinal velocity component, i.e. a component pointing from downstream to upstream. Such points form part of a backflow. A velocity is considered to be positive if it is directed in the flow direction of the glass, from upstream to downstream. Specifically, bubbles may form throughout the conditioning basin, up to its end, as a result of contact between the glass and the materials of said basin. There is therefore a competition between how fast the bubbles rise and their tendency to be towed by the glass, especially from downstream to upstream. It is possible to evaluate the percentage of residual bubbles that enter the channel using a theoretical model known to those skilled in the art in which 100,000 bubbles are randomly placed on the bottom of the conditioning basin, said bubbles moving under the effect of convection of the glass and due to their tendency to rise under the effect of Archimedes principle.

The passage from the conditioning basin to the channel is accompanied by an abrupt decrease in the width of flow of the glass and by a decrease in the depth of glass. This decrease may especially be achieved by walls placed orthogonal to the axis of the device.

Preferably the material used for the conditioning basin, in particular for a working end and optionally for a neck, is a material which can make contact with the molten glass and which does not generate defects in the glass. The same goes for the channel used to transfer glass from the conditioning basin to the forming device. In this channel, the flow of the glass is a plug flow and contains no recirculation cells. A material of this type, such as pure alumina, especially sold under the trade name Jargal, is however extremely expensive and is, on the one hand, used sparingly and, on the other hand, in the most downstream flow zones before the device used to form the glass.

The melting/fining furnace may comprise a melting compartment and a fining compartment of different bottom depths, respectively. The melting compartment is located upstream of the fining compartment (with reference to the flow, direction of the glass) and generally occupies a larger bottom area than that of the fining compartment and may be deeper than the bottom of the fining compartment. The bottom of the melting compartment is generally essentially flat. The bottom of the fining compartment is also generally essentially flat. The passage from the bottom of the melting zone to the bottom of the fining zone may be abrupt, i.e. consist of a vertical step. However, this passage may be more gradual and consist instead of an inclined slope or a succession of steps, possibly extending over a distance generally of at most 1 m. The melting/fining furnace generally comprises four walls: an upstream wall, a downstream wall and two lateral walls. Generally, the two lateral walls are parallel and remain separated from each other by the same distance over the entire length of the furnace. The difference in depth and therefore in glass height between the bottoms of the two zones of the furnace may cause a very intense recirculation cell to form in the melting zone (upstream zone of the furnace). Thus, the bottom of the melting zone is deep enough that the convective intensity of the upstream recirculation cell, in the melting zone, is preferably comprised between 3 and 5 times the pull of the furnace. The downstream recirculation loop is of much lower intensity. It will be noted that the transparency of the glass may influence convective intensity, with a more transparent glass generally giving rise to a higher convective intensity. The convective intensity of a recirculation loop is equal to the ratio of the flow rate of glass circulating from upstream to downstream in this loop (forward flow rate) to the pull of the device and therefore of the process.

The ratio of the glass height in the melting zone to the glass height in the fining zone may especially be comprised between 1.2 and 2. A number of obstructions (steps of height smaller than 50 cm) may be placed on the bottom in the melting zone and on the bottom in the fining zone. Generally, the ratio between the length and width of the melting/fining furnace is comprised in the range extending from 2 to 4.

The device used to form the glass, which follows on from the device according to the invention, may be a device for forming hollow glass, or for forming glass fibre but is more generally a device for forming flat glass, of the type in which the glass is floated on a bath of molten metal such as tin, or of the roller type. This forming device is supplied by a channel that is itself supplied by the conditioning basin. The flow of glass in the channel is a plug flow.

The invention makes it possible to produce and use a melting device comprising a melting/fining furnace and a conditioning basin such that the ratio of the area under flame of the furnace to the area of the conditioning basin is higher than 1.4 and even higher than 1.6 and even higher than 1.8. Preferably, the ratio of the area under flame in the furnace to the area of the conditioning basin ($S_f/S_{cond}$) is lower than 4 and even more preferably lower than 3.

The device and the process according to the invention may be used to melt any type of glass, whether tinted or not, especially soda-lime, aluminosilicate and borosilicate glass, inter alia.

The present invention relates to any process and device comprising or using a glass furnace comprising cross-fired burners, especially to melt glass with a view to forming it into flat glass in a float unit. The invention more particularly relates to processes and devices the melting/fining furnaces of which have a capacity of 500 to 1500 m³ of glass and more particularly of 700 to 1400 m³ of glass. The invention more particularly relates to processes and devices the pull of which is 400 to 1300 tonnes of glass per day. The invention more particularly relates to processes and devices using a furnace in which the glass height is comprised in the range extending from 0.8 to 2 meters (melting zone and fining zone), this height possibly varying from upstream to downstream, and a conditioning basin in which the glass height is comprised in the range extending from 0.4 to 1.40 meters, this height possibly varying from upstream to downstream.

The invention relates in particular to a process for preparing glass using the device according to the invention. The invention more particularly relates to devices and processes in which the maximum surface temperature of the glass in the furnace is comprised between 1350 and 1650° C. and the temperature of the glass output from the conditioning basin is comprised between 1000 and 1400° C.

The figures described below are not to scale.

FIG. 1 shows a device according to the invention, in a) as seen from above and in b) as seen from the side. It comprises from upstream to downstream a furnace 1, which comprises a zone for introducing raw materials 20, a melting zone 2, a fining zone 3 and a conditioning basin comprising a neck 4 and a working end 5. The working end delivers molten glass at an appropriate temperature to the forming unit via the channel 6 inside of which the flow of the glass is a plug flow. The melting/fining furnace 1 is equipped with cross-fired overhead burners, six air inlets of which are shown referenced 7. The two lateral walls 11 and 12 are equipped symmetrically with facing cross-fired burners, these burners being operated in alternation or in "reversal mode", as is known in the art. The exterior limits of the four outermost air inlets (8, 9) form the corners of the quadrilateral 10, hatched in a), representing, as seen from above, the area under flame or $S_f$. The letter $x_0$ indicates the abscissa of the end of the area under flame in the furnace (downstream side of the quadrilateral representing the area under flame) and the letter $x_1$ indicates the abscissa of the end of the conditioning basin, on the median longitudinal axis AA' of the device (A being upstream and A' being downstream) which corresponds to the general flow direction of the glass. Under the level of the surface of the molten glass 13 turn two convection cells 14 and 15. The first 14, called the upstream recirculation loop, is relatively intense in the melting compartment and especially passes under the first upstream burner 9. The second 15, called the downstream recirculation loop, is less intense and passes through the fining zone of the furnace, then through the neck and the working end, but does not pass into the channel 6. An obstruction 16 here reinforces the boundary between, and formation of, the two convection cells 14 and 15. The passage from the furnace to the neck is accompanied by an abrupt decrease in the width and in the cross section of flow of the glass, here achieved with walls 19 and 19' making an angle of 90° to the median flow direction of the glass. The passage from the neck to the working end is accompanied by an abrupt width increase in the cross section of flow of the glass, here achieved with walls 18 and 18' forming an angle of 90° with the median flow direction of the glass. A lowerable barrier 17 at the start of the neck decreases the cross section of glass flow and forms a singular element the $K_{Si}$ of which should be calculated. The surface of the glass 60 in the working end, i.e. the surface making contact with the atmosphere in the working end, is subject to air blown into the latter in order to cool the glass. This air passes from the working end into the conditioning device but as much as possible does not enter into the melting/fining furnace.

Figure 2:
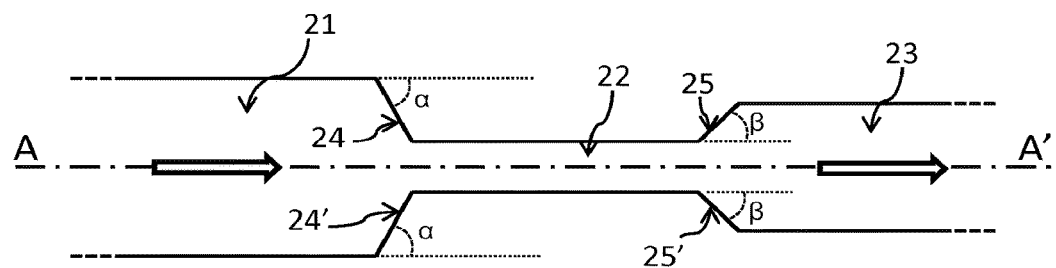

FIG. 2 shows, seen from above, the passage from the fining zone 21 of a furnace to the conditioning basin, which is made up of a neck 22 then a working end 23. The arrows on the median longitudinal axis AA' symbolise the flow of the glass from upstream to downstream. The device is symmetric on either side of the axis AA'. On passing from the furnace to the neck the width of the flow of the glass is abruptly decreased by furnace walls 24 and 24' making an angle α with the flow direction of the glass of at least 40° on either side of the axis AA' of the device. On passing from the neck to the working end, the width of glass flow is clearly increased by way of walls 25 and 25' making an angle β of more than 40° to the flow direction of the glass. This increase occurs on either side of the median longitudinal axis of the device.

Figure 3:
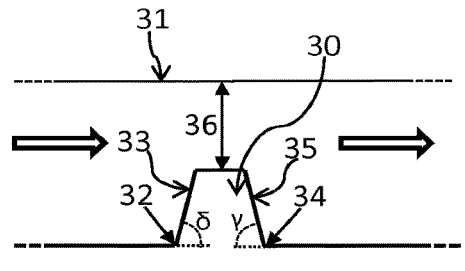

FIG. 3 shows a step 30 that clearly decreases the cross section of flow of the glass, the surface of which is referenced 31 and the flow direction of which is shown by arrows, said step possibly being located in a conditioning basin and in particular in a neck or working end. This is a singular element the $K_S$ of which should be calculated. The singular element starts at the point 32 (it is a point in the figure but in fact it is of course a line perpendicular to the general direction of flow of the glass) where a wall 33 making an angle δ of greater than 40% to the general flow direction of the glass starts to decrease the cross section of flow. The singular element ends at the point 34 at the location where a wall 35 making an angle γ of greater than 40% to the general flow direction of the glass finishes increasing the cross section of flow of the glass. The distance between the point 32 and the point 34 is smaller than 2 m parallel to the general flow direction of the glass shown by the horizontal arrows. This step is the cause of a minimal cross section 36 of glass flow.

Figure 4:
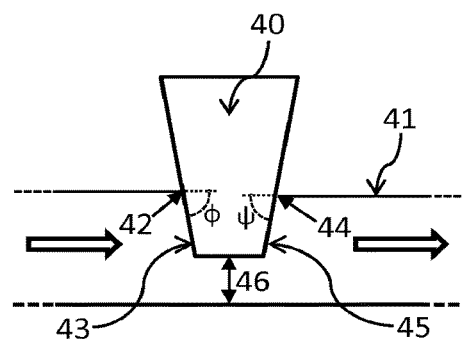

FIG. 4 shows a lowerable barrier 40 submerged in the glass, the surface of which is referenced 41, and the flow direction of which is shown by arrows, said barrier possibly being located in a conditioning basin and in particular in a neck or working end. This is a singular element the $K_{Si}$ of which should be calculated. The singular element starts at the point 42 where a wall 43 making an angle $\psi$ of greater than 40° to the general flow direction of the glass starts to decrease the cross section of flow of the glass. The singular element ends at the location of the point 44 where a wall 45 making an angle $\psi$ of greater than 40° to the general flow direction of the glass finishes increasing the cross section of flow of the glass. The distance between the point 42 and the point 44 is smaller than 2 m parallel to the general flow direction of the glass shown by the horizontal arrows. This barrier is the cause of a minimal cross section 46 of glass flow.

Figure 5:
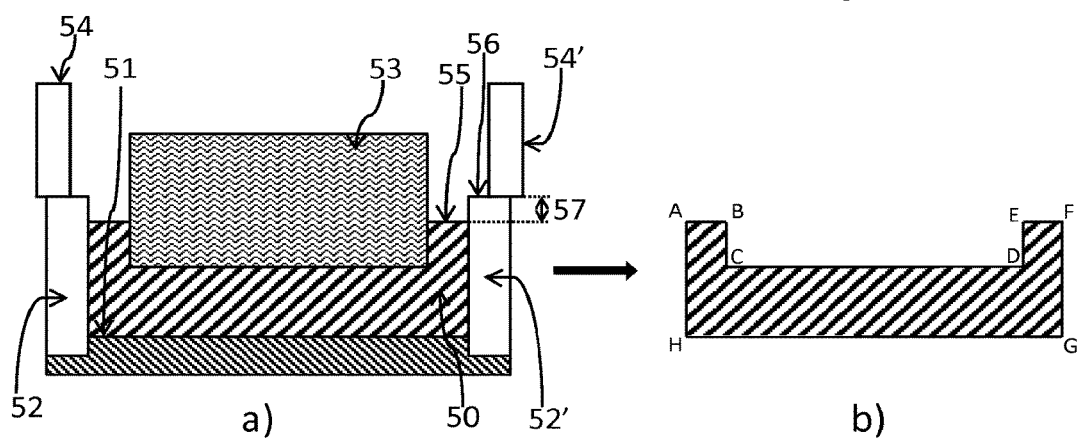

FIG. 5a) shows a cross-sectional plane through the device orthogonal to the flow direction of the glass at an abscissa x. It may especially be a cross section through the neck or working end. The glass 50 flows orthogonally to the plane of the figure. The glass is contained by the bottom 51 and the tank blocks 52 and 52', which bottom and tank blocks form part of the substructure of the device. A barrier 53 is submerged in the glass over only some of the distance between the tank blocks, in the plane of the cross section of flow of the glass. The system maintaining the barrier is not shown, nor is the roof covering the interior of the device. The glass level 55 making contact with the internal atmosphere is located below the upper level 56 of the tank blocks by a distance 57 called a safety margin. The elements 54 and 54' are borne by the tank blocks and form part of the superstructure. FIG. 5b) explains what is meant by the expressions "area of the cross section of flow of the glass at the abscissa x" and "perimeter of the cross section of flow of the glass of the device at the abscissa x", as applied to the case in FIG. 5a). The area of the cross section of flow of the glass is the area of the hatched zone in FIG. 5b). The perimeter of the cross section of flow of the glass is the sum of the length of the segments AB, BC, CD, DE, EF, FG, GH and HA.

EXAMPLES 1 TO 19

All the examples were carried out in a device such as shown in FIG. 1 and comprising a melting/fining furnace followed by a conditioning basin made up of a neck followed by a working end. Tables 1 and 2 give the dimensions of the various elements of the device and the results. All the furnaces of the examples had an area under flame $S_f$ of 326.3 m². All the examples were intended to provide a pull of 900 tonnes per day of molten glass, the maximum surface temperature of the glass in the furnace was 1590° C. and the temperature at the outlet of the working end was 1130° C. The glass was standard soda-lime glass with a content by weight of 700 ppm $Fe_2O_3$ and 180 ppm FeO. In all the examples except Examples 5, 8 and 19, a 50 mm-thick barrier maintained by the superstructure of the neck and submerged in the glass over a depth of 400 mm was placed in the neck so that the upstream face of this barrier was located 3.2 meters from the inlet of the neck. In the case of Example 5, there was no barrier ($K_s$=0). For Example 8, the barrier was submerged in the glass to a depth of 350 mm. For Example 19, the barrier was submerged in the glass to a depth of 500 mm. Where appropriate, the barrier was the only singular element for which it was necessary to calculate a $K_{Si}$.

For all the examples:
the length of the melting zone was 26 675 mm;
the width of the melting and fining zones was 13 000 mm;
the length of the fining zone was 17 000 mm;
the distance between the end of the area under flame and the inlet of the neck was 14 075 mm;
$h_f$ represents the glass height in the melting zone;
$h_a$ represents the glass height in the fining zone;
$V_{fa}$ represents the volume of glass in the furnace;
$L_c$ represents the length of the neck;
$l_c$ represents the width of the neck;
$h_c$ represents the glass height in the neck;
$L_b$ represents working end length;
$l_b$ represents working end width;
$h_b$ represents the glass height in the working end;
$\Delta Q$ represents the quality of the glass relative to the quality of the glass of Example 1 (reference case) i.e. the difference between the quality of the glass of the Example i in question and the quality of the glass of Example 1, the sum being divided by the quality of Example 1 $\Delta Q=(Q_i-Q_1)/Q_1$; it is the average time spent at above 1400° C. that is considered. This $\Delta Q$ is multiplied by 100 in Table 1 in order to express the result in percent;

$\Delta$Conso represents the energy consumption of the entire device relative to the consumption of Example 1, i.e. the difference between the consumption of the Example i in question and the consumption of Example 1, the sum being divided by the consumption of Example 1: $\Delta$Conso=(Conso$_i$−Conso$_1$)/Conso$_1$; this $\Delta$Conso is multiplied by 100 in Table 1 in order to express the result in percent; and $\Delta$Souff represents the intensity of blown cooling of the working end relative to the intensity of blown cooling of the working end of Example 1, i.e. the difference between the intensity of blown cooling of the working end of the Example i in question and the intensity of blown cooling of the working end of Example 1, the sum being divided by the intensity of blown cooling of the working end of Example 1: $\Delta$Souff=(Souff$_i$−Souff$_1$)/Souff$_1$; this $\Delta$Souff is multiplied by 100 in Table 2 in order to express the result in percent.

TABLE 1

| Ex No. | $h_f$ (m) | $h_a$ (m) | $V_{fa}$ (m³) | $L_c$ (m) | $l_c$ (m) | $h_c$ (m) | $L_b$ (m) | $l_b$ (m) | $h_b$ (m) | K | $\Delta Q$ (%) | $\Delta$Conso (%) |
|---|---|---|---|---|---|---|---|---|---|---|---|---|
| 1 | 1.45 | 1.45 | 823 | 7 | 4.8 | 1.45 | 17 | 12 | 1.45 | 2.31 | 0 | 0.0 |
| 2 | 1.45 | 1.45 | 823 | 7 | 4.8 | 1.45 | 12.75 | 9 | 1.45 | 2.35 | −7 | 1.8 |
| 3 | 1.45 | 1.27 | 783 | 7 | 4.8 | 1.27 | 12.75 | 9 | 1.27 | 3.63 | 3 | −1.2 |
| 4 | 1.45 | 1.27 | 783 | 7 | 4.8 | 1.27 | 12.75 | 9 | 0.89 | 5.07 | 11 | −3.5 |
| 5 | 1.45 | 1.27 | 783 | 7 | 4.8 | 0.89 | 12.75 | 9 | 0.89 | 5.67 | 12 | −4.1 |
| 6 | 1.45 | 1.27 | 783 | 7 | 6.5 | 0.89 | 12.75 | 9 | 0.89 | 8.50 | 23 | −6.9 |
| 7 | 1.45 | 1.27 | 783 | 7 | 4.8 | 1.27 | 12.75 | 9 | 0.6 | 9.86 | 28 | −8.2 |

TABLE 1-continued

| Ex No. | $h_f$ (m) | $h_a$ (m) | $V_{fg}$ (m$^3$) | $L_c$ (m) | $l_c$ (m) | $h_c$ (m) | $L_b$ (m) | $l_b$ (m) | $h_b$ (m) | K | ΔQ (%) | ΔConso (%) |
|---|---|---|---|---|---|---|---|---|---|---|---|---|
| 8 | 1.45 | 1.27 | 783 | 7 | 4.8 | 0.89 | 12.75 | 9 | 0.89 | 10.01 | 26 | −7.4 |
| 9 | 1.45 | 1.27 | 783 | 4.5 | 4.8 | 0.89 | 12.75 | 9 | 0.89 | 11.46 | 31 | −8.6 |
| 10 | 1.45 | 1.27 | 783 | 7 | 4.8 | 0.89 | 12.75 | 13 | 0.89 | 11.65 | 31 | −8.3 |
| 11 | 2 | 2 | 1136 | 7 | 4.8 | 0.89 | 12.75 | 9 | 0.89 | 12.02 | 28 | −7.2 |
| 12 | 1.45 | 1.45 | 823 | 7 | 4.8 | 0.89 | 12.75 | 9 | 0.89 | 12.26 | 27 | −8.5 |
| 13 | 1.45 | 1.27 | 783 | 7 | 4.8 | 0.89 | 12.75 | 9 | 0.89 | 12.45 | 28 | −8.4 |
| 14 | 2 | 1.27 | 974 | 7 | 4.8 | 0.89 | 12.75 | 9 | 0.89 | 12.45 | 28 | −7.5 |
| 15 | 1.27 | 1.27 | 721 | 7 | 4.8 | 0.89 | 12.75 | 9 | 0.89 | 12.45 | 27 | −9.3 |
| 16 | 1.45 | 0.89 | 700 | 7 | 4.8 | 0.89 | 12.75 | 9 | 0.89 | 13.51 | 32 | −8.9 |
| 17 | 1.45 | 1.27 | 783 | 7 | 4.8 | 0.89 | 12.75 | 4.8 | 0.89 | 15.17 | 36 | −9.1 |
| 18 | 1.45 | 1.27 | 783 | 7 | 3.7 | 0.89 | 12.75 | 9 | 0.89 | 18.22 | 36 | −9.7 |
| 19 | 1.45 | 1.27 | 783 | 7 | 4.8 | 0.89 | 12.75 | 9 | 0.89 | 21.76 | 41 | −9.9 |

The values of $K_a$ and of $K_S$ due to the lowerable barrier (where $K=K_a+K_S$), the conditioning basin area characteristics and the blowing characteristics are detailed in Table 2, $\sigma_{sc}$ representing the minimal cross section of flow of the glass produced by the barrier in the neck (by way of singular element), $S_c$ representing the area of glass making contact with the atmosphere in the neck, $S_b$ being the area of glass making contact with the atmosphere in the working end, $S_{cond}$ representing the area of the glass making contact with the atmosphere in the conditioning basin (where $S_{cond}=S_c+S_b$), and $S_f/S_{cond}$ representing the ratio of the area under flame to the area of glass making contact with the atmosphere in the conditioning basin.

TABLE 2

| Ex No. | Ka | $\sigma_{sc}$ (m$^2$) | $K_s$ | K | $S_c$ (m$^2$) | $S_b$ (m$^2$) | $S_{cond}$ (m$^2$) | $S_f/S_{cond}$ | ΔSouff (%) |
|---|---|---|---|---|---|---|---|---|---|
| 1 | 1.75 | 5.04 | 0.56 | 2.31 | 33.6 | 204 | 237.6 | 1.37 | 0 |
| 2 | 1.79 | 5.04 | 0.56 | 2.35 | 33.6 | 114.75 | 148.35 | 2.20 | 119 |
| 3 | 2.55 | 4.176 | 1.07 | 3.63 | 33.6 | 114.75 | 148.35 | 2.20 | 83 |
| 4 | 4.00 | 4.176 | 1.07 | 5.07 | 33.6 | 114.75 | 148.35 | 2.20 | 55 |
| 5 | 5.67 | 4.272 | 0 | 5.67 | 33.6 | 114.75 | 148.35 | 2.20 | 46 |
| 6 | 4.84 | 3.185 | 3.65 | 8.50 | 45.5 | 114.75 | 160.25 | 2.04 | 14 |
| 7 | 8.78 | 4.176 | 1.07 | 9.86 | 33.6 | 114.75 | 148.35 | 2.20 | 7 |
| 8 | 5.73 | 2.592 | 4.29 | 10.01 | 33.6 | 114.75 | 148.35 | 2.20 | 11 |
| 9 | 4.77 | 2.352 | 6.70 | 11.46 | 21.6 | 114.75 | 136.35 | 2.39 | 17 |
| 10 | 4.96 | 2.352 | 6.70 | 11.65 | 33.6 | 165.75 | 199.35 | 1.64 | −38 |
| 11 | 5.32 | 2.352 | 6.70 | 12.02 | 33.6 | 114.75 | 148.35 | 2.20 | 0 |
| 12 | 5.56 | 2.352 | 6.70 | 12.26 | 33.6 | 114.75 | 148.35 | 2.20 | −6 |
| 13 | 5.75 | 2.352 | 6.70 | 12.45 | 33.6 | 114.75 | 148.35 | 2.20 | 2 |
| 14 | 5.75 | 2.352 | 6.70 | 12.45 | 33.6 | 114.75 | 148.35 | 2.20 | 2 |
| 15 | 5.75 | 2.352 | 6.70 | 12.45 | 33.6 | 114.75 | 148.35 | 2.20 | −3 |
| 16 | 6.81 | 2.352 | 6.70 | 13.51 | 33.6 | 114.75 | 148.35 | 2.20 | −2 |
| 17 | 8.47 | 2.352 | 6.70 | 15.17 | 33.6 | 61.2 | 94.8 | 3.44 | 89 |
| 18 | 6.94 | 1.813 | 11.27 | 18.22 | 25.9 | 114.75 | 140.65 | 2.32 | −6 |
| 19 | 5.84 | 1.872 | 15.92 | 21.76 | 33.6 | 114.75 | 148.35 | 2.20 | −15 |

The examples are numbered from 1 to 19 in order of increasing factor K. It will be noted that there is a correlation between the quality ΔQ obtained for the glass and the factor K, a higher quality glass being obtained in examples 3 to 19. As may be seen it is recommendable for K to be higher than 3.5 and preferably higher than 5.5 and even more preferably higher than 7.5. The energy consumptions of Examples 3 to 19 are also good. Small working ends of 114.75 m$^2$ are generally enough, except in Example 2 where the blowing intensity is too high. For the blowing intensity used in Example 1, the risk of optical defects appearing on the surface of the glass is low. In contrast, this risk is real in the case of Example 2, since a conditioning basin area of 148.35 m$^2$ requires a ΔSouff higher than 119% of that of Example 1. It will be noted that if ΔSouff is higher than 90% of that of Example 1, then the risk of optical defects appearing on the surface is too high, which is the case for Example 2. Preferably, ΔSouff is lower than 85% of that of Example 1. In order to achieve this, K should be sufficiently high, in accordance with the present invention, and the ratio of the area under flame to the area of the conditioning basin ($S_f/S_{cond}$) should be lower than 4 and preferably lower than 3, and even more preferably lower than 2.5. In the case of Example 10, the area of the conditioning basin is very large and therefore costly to produce, this high area explaining the low blowing intensity. In this configuration, the area of the conditioning basin could be decreased.

In all the examples, the bottom temperature was below 1360° C.

In all the examples except example 7, the glass contained residual bubbles in an amount of less than 50%. Example 7 corresponds to Example 4 except that the depth of the working end was 600 mm. Because of the small depth of the working end, the recirculation loop passing through the conditioning basin also passed through the neck and a good part of the working end but did not reach as far as the inlet of the channel. In the last 7 meters of the working end, the flow of the glass was a plug flow. At the inlet of the channel the glass contained residual bubbles in an amount of 60%.

EXAMPLE 20

The device had the same dimensions as the device of Example 1, except that there was no barrier, and the depth of the working end was decreased by 50% (to 0.72 m) and the width of the working end was decreased to 6 meters. The value of K was 10.22. The recirculation loop passing through the conditioning basin passed through the neck and a portion of the working end but did not extend as far as the channel since there was no recirculation in the last 7 meters of the working end, the flow then being a plug flow. At the channel inlet, the glass contained 50.4% residual bubbles. The other results were as follows: ΔSouff=24%, Sf/Scond=2.41 and ΔQ=−8.

The invention claimed is:

1. A process for manufacturing molten glass in a device comprising, from upstream to downstream, a furnace for melting and fining glass equipped with cross-fired overhead burners, and then a conditioning basin comprising one or more compartments, the process comprising melting glass in the furnace,
wherein:
the furnace comprises a melting zone and a fining zone;
the bottom of the fining zone and the bottom of the conditioning basin are deep enough that a single downstream recirculation loop passes through the fining zone and through all the compartments of the conditioning basin;
the conditioning basin is supplied with glass by the furnace; and
the dimensions of the device are such that K is higher than 3.5, where:

$$K = K_a + \sum_i K_{S_i},$$

in which:

$$K_a = 0.000727 \times S_f \times \int_{x_0}^{x_1} \frac{[P(x)]^2}{[\sigma(x)]^3} dx;$$

$S_f$ represents the area under flame in the furnace;
$x_0$ is the abscissa in the general flow direction of the glass of the end of the area under flame in the furnace;
$x_1$ is the abscissa in the general flow direction of the glass of the end of the conditioning basin;
$\sigma(x)$ represents the area of the cross section of flow of the glass of the device at the abscissa x;
$P(x)$ represents the perimeter of the cross section of flow of the glass of the device at the abscissa x; and
$\Sigma_i K_{S_i}$ represents the sum of the $K_{S_i}$ due to a singular element in the device downstream of the area under flame in the furnace, a singular element producing, from upstream to downstream and over less than 2 m in the flow direction of the glass, a decrease in the cross section of flow of the glass of more than 10% then an increase in the cross section of flow of the glass of more than 10%, where $$K_{S_i} = 0.0012 \times \left( \exp\left[5.16\left(\frac{\sigma_i - \sigma_{S_i}}{\sigma_i}\right)^{2.55}\right] - 1 \right) \left(\frac{S_f}{\sigma_i}\right)^2;$$

$\sigma_i$ representing the area of the cross section of flow of the glass just upstream of the singular element $S_i$; and
$\sigma_{S_i}$ representing the area of the minimum cross section of flow produced by the singular element $S_i$.

2. The process of claim 1, wherein K>5.5.
3. The process of claim 2, wherein K>7.5.
4. The process of claim 3, wherein K is higher than 9.
5. The process of claim 1, wherein a ratio of the area under flame in the furnace to the area of the conditioning basin is higher than 1.4.
6. The process of claim 5, wherein the ratio of the area under flame in the furnace to the area of the conditioning basin is higher than 1.6.
7. The process of claim 6, wherein the ratio of the area under flame in the furnace to the area of the conditioning basin is higher than 1.8.
8. The process of claim 1, wherein the furnace is sufficiently deep that an upstream recirculation loop and the downstream recirculation loop form in the furnace.
9. The process of claim 1, wherein the conditioning basin comprises, from upstream to downstream, a neck then a working end.
10. The process of claim 1, wherein the furnace has a capacity of 500 to 1500 m³ of glass.
11. The process of claim 1, having a pull of 400 to 1300 tonnes of glass per day.
12. The process of claim 1, wherein the cross-fired overhead burners use an oxidant comprising 10 to 30 vol % $O_2$, and are equipped with regenerators and function pairwise in reversal mode.
13. The process of claim 1, wherein the cross-fired overhead, burners use an oxidant containing 80 to 100 vol % $O_2$.
14. The process of claim 1, wherein in the conditioning basin in any vertical plane transverse to the longitudinal axis of the furnace, there are points in the glass having a longitudinal velocity component pointing from downstream to upstream.
15. The process of to claim 1, wherein after the conditioning basin, the glass passes into a channel itself supplying a forming device, with no backflow occurring in the channel.
16. The process of claim 15, wherein a length of the channel ranges from 0.3 to 10 m.
17. A process for manufacturing flat glass, the process comprising manufacturing a molten glass with the process of claim 1, and then forming the molten glass into flat glass by floating the molten glass on a molten metal bath in a float chamber.
18. A device for manufacturing molten glass, the device comprising, from upstream to downstream, a furnace for melting and fining glass equipped with cross-tired overhead burners, and then a conditioning basin comprising one or more compartments,
wherein:
the furnace comprises a melting zone and a fining zone;
the bottom of the fining zone and the bottom of the conditioning basin are deep enough that a single downstream recirculation loop passes through the fining zone and through all the compartments of the conditioning basin;
the conditioning basin is supplied with glass by the furnace; and
the dimensions of the device are such that K is higher than 3.5, where:

$$K = K_a + \sum_i K_{S_i},$$

in which:

$$K = 0.000727 \times S_f \times \int_{x_0}^{x_1} \frac{[P(x)]^2}{[\sigma(x)]^3} dx;$$

$S_f$ represents the area under flame in the furnace;
$x_0$ is the abscissa in the general flow direction of the glass of xe end of the area under flame in the furnace;
$x_1$ is the abscissa in the general flow direction of the glass of xe end of the conditioning basin;
$\sigma(x)$ represents the area of the cross section of flow of the glass of the device at the abscissa x;
P(x) represents the perimeter of the cross section of flow of the glass of the device at the abscissa x; and
$\Sigma_i K_{Si}$ represents the sum of the $K_{Si}$ due to a singular element in the device downstream of the area under flame in the furnace, a singular element producing, from upstream to downstream and over less than 2 m in the flow direction of the glass, a decrease in the cross section of flow of the glass of more than 10% then an increase in the cross section of flow of the glass of more than 10%, where $$K_{S_i} = 0.0012 \times \left( \exp\left[ 5.16 \left( \frac{\sigma_i - \sigma_{S_i}}{\sigma_i} \right)^{2.55} \right] - 1 \right) \left( \frac{S_f}{\sigma_i} \right)^2;$$

$\sigma_i$ representing the area of the cross section of flow of the glass just upstream of the singular element $S_i$; and $\sigma_{Si}$ representing the area of the minimum cross section of flow produced by the singular element $S_i$.

19. The device of claim 18, wherein K>5.5.
20. The device of claim 19, wherein K>7.5.
21. The device of claim 20, wherein K is higher than 9.
22. The device of claim 18, wherein a ratio of the area under flame in the furnace to the area of the conditioning basin is higher than 1.4.
23. The device of claim 22, wherein the ratio of the area under flame in the furnace to the area of the conditioning basin is higher than 1.6.
24. The device of claim 23, wherein the ratio of the area under flame in the furnace to the area of the conditioning basin is higher than 1.8.
25. The device of claim 18, wherein
a ratio of the area under flame in the furnace to the area of the conditioning basin is lower than 4.
26. The device of claim 18, wherein the furnace is deep enough that an upstream recirculation loop and the downstream recirculation loop form in the furnace.
27. The device of claim 18, wherein the conditioning basin comprises, from upstream to downstream, a neck then a working end.
28. The device of claim 18, wherein the furnace has a capacity of 500 to 1500 m³ of glass.
29. The device of claim 18, having a pull of 400 to 1300 tonnes of glass per day.

30. The device of claim 18, wherein the cross-fired burners use an oxidant comprising 10 to 30 vol % $O_2$, and are equipped with regenerators and function pairwise in reversal mode.
31. The device of claim 18, wherein in the conditioning basin in any vertical plane transverse to the longitudinal axis of the furnace, there are points in the glass having a longitudinal velocity component pointing from downstream to upstream.
32. The device of claim 18, wherein after the conditioning basin, a glass being manufactured passes into a channel itself supplying a forming device, with no backflow occurring in the channel.
33. The device of claim 32, wherein a the length of the channel ranges from 0.3 to 10 m.
34. A device for manufacturing flat glass, the device comprising the device of claim 18, and a float chamber in which a molten glass is floated on a molten metal bath.
35. The device of claim 18, further comprising, over its entire length, tank blocks containing the molten glass, wherein glass height is a distance between the upper level of the tank blocks decreased by a safety margin of between 30 and 130 mm and the level of the bottom.
36. The process of claim 3, wherein K is higher than 10.5.
37. THE process of claim 1, wherein:
K>5.5;
a ratio of the area under flame in the furnace to the area of the conditioning basin is higher than 1.4;
the furnace is sufficiently deep that an upstream recirculation loop and the downstream recirculation loop form in the furnace;
in the conditioning basin in any vertical plane transverse to the longitudinal axis of the furnace, there are points in the glass having a longitudinal velocity component pointing from downstream to upstream; and
after the conditioning basin, the glass passes into a channel itself supplying a forming device, with no backflow occurring in the channel.
38. The device of claim 20, wherein K is higher than 10.5.
39. The device of claim 18, wherein:
K>5.5;
a ratio of the area under flame in the furnace to the area of the conditioning basin is higher than 1.4;
the furnace is deep enough that an upstream recirculation loop and the downstream recirculation loop form in the furnace;
in the conditioning basin in any vertical plane transverse to the longitudinal axis of the furnace, there are points in the glass having a longitudinal velocity component pointing from downstream to upstream; and
after the conditioning basin, a glass being manufactured passes into a channel itself supplying a forming device, with no backflow occurring in the channel.

* * * * *